July 2, 1935.  L. J. WOLF  2,006,935

FREQUENCY METER

Filed Feb. 4, 1929

INVENTOR
Lester J. Wolf.
BY
Wesley G. Carr
ATTORNEY

Patented July 2, 1935

2,006,935

UNITED STATES PATENT OFFICE 2,006,935

FREQUENCY METER

Lester J. Wolf, Pittsburgh, Pa., assignor to Westinghouse Electric & Manufacturing Company, a corporation of Pennsylvania Application February 4, 1929, Serial No. 337,477

6 Claims. (Cl. 172—293)

My invention relates to electrical measuring instruments and more particularly to high-frequency alternating-current frequency meters.

Heretofore, much difficulty has been experienced in measuring the frequency of the high-frequency alternating currents produced by a tuning-fork generator or the like, having a frequency of approximately 5,000 cycles per second.

My invention has for an object to provide means for quickly and accurately measuring the frequency of a high-frequency alternating current.

Another object of my invention is to provide means for rotating an indicating hand directly in accordance with the frequency of a high-frequency alternating current having a frequency in the order of 5,000 cycles per second.

Another object of my invention is to provide means for synchronizing the speed of a motor with the frequency of a high-frequency alternating current traversing a circuit.

A further object of my invention is to provide means for separately energizing a synchronous motor in the circuit of a high-frequency alternating current whereby said motor draws no current from said circuit.

A still further object of my invention is to provide means for operating and energizing a synchronous motor by a vacuum-tube amplifier.

A still further object of my invention is to provide means for manually controlling the speed of a synchronous motor.

These and other desirable objects are obtained by apparatus constructed in accordance with my invention, which is described below in connection with the accompanying drawing.

Figure 1:
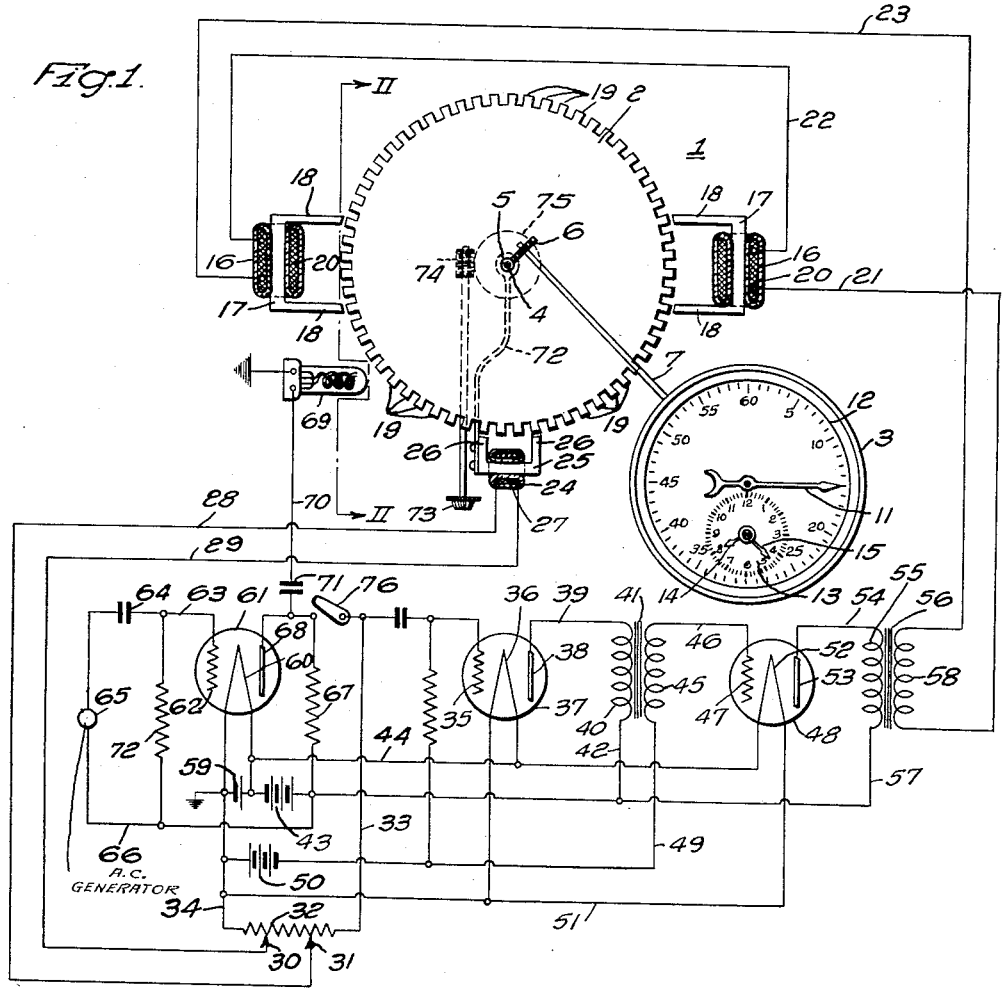
Figure 1 is a diagrammatic view, partially in section, of a frequency meter constructed in accordance with my invention.
Figure 2:
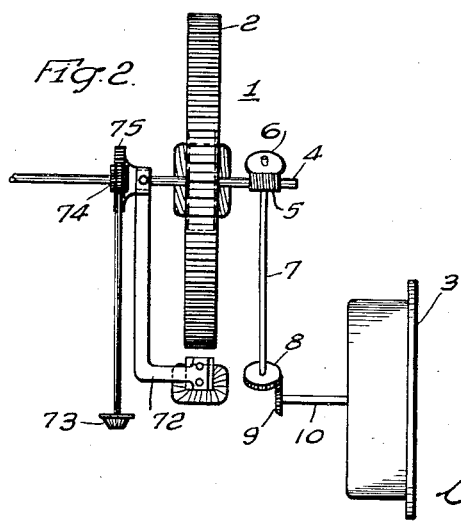
Fig. 2 is a view, in side elevation, of the frequency meter taken on the line II—II of Fig. 1.

The synchronous motor 1 includes a toothed laminated iron rotor 2 geared to a revolution counter 3, as shown more clearly in Fig. 2, by means of shaft 4, pinion gear 5 mounted thereon, gear wheel 6 meshing with pinion gear 5, shaft 7 supporting gear wheel 6 and gear wheel 8, gear wheel 9 meshing with gear wheel 8, and shaft 10 supporting the gear wheel 9 and pointer 11.

The revolution counter 3 is made in the form of the usual chronometer having a dial 12 for the pointer 11 calibrated in seconds. A clock dial 13 and coacting hour and minute hands 14 and 15, respectively, are also provided on the dial 12. The hands 14 and 15 are geared to, and driven by, the pointer 11 in the usual manner.

The stationary armature 16 consists of two permanent magnets 17, of substantially U-shape, disposed, preferably, on diametrically opposite sides of the laminated rotor 2. The pole pieces 18 of the magnets 17 are designed to magnetically coact with the teeth 19 of the laminated wheel 2 to effect the rotation thereof when the magnets are energized by an alternating current flowing through coils 20 wound on the magnets. The coils 20 are connected in series-circuit relation by conductors 21, 22 and 23.

An auxiliary generating armature 24, consisting of a U-shape permanent magnet 25 having pole pieces 26 and a coil 27 wound thereon, is mounted near the toothed wheel 2 in such manner that the motion of the wheel 2 causes the teeth 19 to generate an alternating current in the coil 27.

The coil 27 is connected, by conductors 28 and 29, to the variable contactors 30 and 31 of a potentiometer 32. The potentiometer 32 is, in turn, connected, by conductors 33 and 34, to the grid 35 and filament or cathode 36 of a vacuum-tube amplifier 37. The anode 38 of the latter is connected, by a conductor 39, to a terminal of the primary winding 40 of an audio-frequency transformer 41. The other terminal of the primary winding 40 is connected, by a conductor 42, to one terminal of a "B" battery 43 the other terminal of which is connected, by a conductor 44, to the filament 36.

The secondary winding 45 of the transformer 41 is connected, at one terminal, by a conductor 46, to the grid 47 of a second vacuum-tube amplifier 48 and, at the other terminal, by a conductor 49, to one terminal of a "C" battery 50. The other terminal of the "C" battery 50 is connected, by a conductor 51, to the filament 52 of the tube 48. The plate 53 of the tube 48 is connected, by a conductor 54, to a terminal of the primary winding 55 of an audio-frequency transformer 56. The other terminal of the primary winding 55 is connected, by a conductor 57, to one terminal of the "B" battery 43. The other terminal of the "B" battery 43 is connected to the filament 52 by the conductor 44. The secondary winding 58 of the audio-frequency transformer 56 has its terminals connected to the conductors 21 and 23 to energize the armatures 16.

The filaments or cathodes 36 and 52 of the amplifying tubes 37 and 48, respectively, are heated by an "A" battery 59 which has its negative terminal grounded. The "A" battery 59 also serves to heat the filament 60 of an amplifying vacuum tube 61. The tube 61 has its grid 62 connected, by a conductor 63, through a condenser 64, to one terminal of a high-frequency alternating-current generator 65. The other terminal of the generator 65 is connected, by conductor 66, through a resistor 67, to the plate 68 of the tube 61. The "B" battery 43 has its terminals connected, respectively, to the plate 68 and the filament 60.

The amplifying tube 61 amplifies the output of the high-frequency generator 65 to intermittently light a neon lamp 69 having one of its terminals grounded and the other of its terminals connected, by a conductor 70, through a condenser 71, to the plate 68 of the tube 61. A resistor 72 is connected across the conductors 66 and 64 of the input circuit. The current from the high-frequency alternating-current generator 65 is amplified by the tube 61 to light the lamp 69 intermittently, in accordance with its frequency.

The lamp 69 is placed near the periphery of the laminated wheel 2 so that the flickering light emitted therefrom may be stroboscopically compared with the pole projections 19 when the wheel 2 is rotating. When the speed of the wheel 2 is such that it is synchronized with the frequency of the alternating-current supply 65, the pole-projections 19 of the wheel 2 appear stationary in the flickering light of the lamp 69, because of the well known stroboscopic phenomena.

For starting purposes, the armature 24 functions as a generator of alternating electro-motive force, when the wheel 2 is manually spun, by the motion of the pole-projections 19 past the poles 26 of the permanent magnet 25. Such alternating electro-motive force is amplified by the tubes 37 and 48 to energize the armatures 16 to turn the rotor 2.

The "pick up magnet" or generator 24 is in magnetic relation to the rotor 2, but not to the armatures 16, and is mounted on a spoke 72 that is turnable, by means of an adjustable thumbpiece 73, worm gear 74 and gear wheel 75, about the same axis of rotation as the rotor 2, through an angle of at least twice the pole pitch of the pole-projections 19 on the rotor 2.

A switch 76 is provided between the output circuit of the tube 61 and the input circuit of the tube 37 so that the output circuit of the "pick up magnet" 24 may be placed in parallel-circuit relation with the output circuit of the tube 61, after the rotor has been brought up to synchronous speed.

The rotor is started by hand, and the position of the "pick up magnet" is changed until the speed of the rotor is in synchronism with the frequency of the alternating current of the generator 65, which condition is indicated by the stroboscopic effect of the light from the lamp 69, as described above. The amplifiers 37 and 38 supply the power to overcome the losses of the rotor 2 and the losses of the generating and motoring armatures 24 and 16, respectively.

The potentiometer 32 may be adjusted to change the voltage ratio of the "pick up magnet" 24 to the grid 35 of the tube 36 when the switch 76 is open and to change the voltage ratio of the output of the tube 61 and the input of the tube 37 when the switch 76 is closed.

When the speed of the rotor increases until it is nearly equal to the frequency to be measured, the switch 76 is closed and the rotor 2 pulls into step. The power of the generator 65 supplying the alternating-current, the frequency of which is to be measured, need not be of itself sufficient to maintain the motor in synchronism because some of the motor losses are supplied by the regenerating amplifier.

Since the speed of the motor 1 bears a fixed ratio to the frequency of the alternating-current of the generator 65, that is to be measured, it is only necessary to time the number of revolutions of the pointer 11. In this manner, the frequency is very accurately measured, because the errors of observation may be minimized by running the experiment over a long period of time.

While my invention is primarily applicable to the measurement of audio frequencies, it is also a high-frequency synchronous motor having means for supplying its losses without putting a load on the source of the frequency to be measured.

My invention comprises a regenerating synchronous motor and also a generator of sustained oscillations and means for utilizing these devices for measuring high frequencies in the order of 5,000 cycles per second.

I claim as my invention:

1. The combination, with an independent source of alternating current, of a synchronous motor including a movable element, means for supplying the losses of said motor including an amplifier controlled by cooperation with said movable element and by said independent source of alternating current, whereby the motor may be operated in synchronism with the frequency of said source without drawing substantial power therefrom.

2. A synchronizing system including an alternating current motor, a vacuum tube amplifying system having its output circuit connected with said motor for driving the same, a generator coil associated with and forming a portion of said motor assembly and electrically independent of the driving coils thereof, means for impressing energy impulses generated in said generator coil through the rotation of said motor upon said vacuum tube circuit for producing regeneration of said impulses and driving said motor, and means for superimposing synchronizing impulses upon the input circuit of said vacuum tube amplifier so as to lock said motor at synchronous speed.

3. In a synchronizing system, an alternating current motor having electrically independent motor and generator coils associated therewith, an input circuit for receiving synchronizing impulses of a predetermined frequency, an amplifying circuit connected with said input circuit, means for connecting the output of said amplifying circuit with the motor coil of said motor for driving said motor, and means for connecting the generator coil of said motor with said amplifying circuit so that said initially supplied synchronizing impulses are superimposed upon generated impulses of a frequency proportionate to the motor speed as generated by said generator coil so as to lock the said motor at synchronous speed.

4. The combination, with an independent source of periodic current, of a synchronous motor including a movable element, means for supplying the losses of said motor including an amplifier controlled by cooperation with said movable element and by said independent source of periodic current, whereby the motor may be operated in synchronism with the frequency of said source without drawing substantial power therefrom.

5. A synchronizing system including a periodic current motor, a vacuum tube amplifying system having its output circuit connected with said motor for driving the same, generator means associated with and forming a portion of said motor assembly, means for impressing energy impulses generated in said generator means through the rotation of said motor upon said vacuum tube circuit for producing regeneration of said impulses and driving said motor, and means for superimposing synchronizing impulses upon the input circuit of said vacuum tube amplifier so as to lock said motor at synchronous speed.

6. In a synchronizing system, a periodic current motor having motor and generator coils associated therewith, an input circuit for receiving synchronizing impulses of a predetermined frequency, an amplifying circuit connected with said input circuit, means for connecting the output of said amplifying circuit with the motor coil of said motor for driving said motor, and means for connecting the generator coil of said motor with said amplifying circuit so that said initially supplied synchronizing impulses are superimposed upon generated impulses of a frequency proportionate to the motor speed as generated by said generator coil so as to lock the said motor at synchronous speed.

LESTER J. WOLF.